United States Patent [19]

Cakmak et al.

[11] Patent Number: 5,114,987

[45] Date of Patent: May 19, 1992

[54] FOAMED POLYMER BLENDS

[75] Inventors: Mukerrem Cakmak, Monroe Falls, Ohio; Anit Dutta, Wilmington, Del.

[73] Assignee: Edison Polymer Innovation Corp., Broadview Heights, Ohio

[21] Appl. No.: 597,431

[22] Filed: Oct. 15, 1990

[51] Int. Cl.$^5$ .............................................. C08J 9/10
[52] U.S. Cl. ................................. 521/84.1; 521/134; 521/139; 521/140
[58] Field of Search ............... 521/134, 140, 139, 84.1

[56] References Cited

U.S. PATENT DOCUMENTS

| | | |
|---|---|---|
| 3,981,830 | 9/1976 | Takeuchi et al. |
| 4,166,890 | 9/1979 | Fried et al. |
| 4,247,652 | 1/1981 | Matsuda et al. |
| 4,442,233 | 4/1984 | Lohmar et al. |
| 4,460,748 | 7/1984 | Rauer . |
| 4,510,031 | 4/1985 | Matsumura et al. |
| 4,519,963 | 5/1985 | Yoshida et al. |
| 4,607,059 | 8/1986 | Kmiec et al. |
| 4,680,317 | 7/1987 | Kuhnel et al. |
| 4,701,472 | 10/1987 | Koebisu et al. |
| 4,721,591 | 1/1988 | Cheng-Shiang . |
| 4,766,159 | 8/1988 | Kitagawa et al. |

Primary Examiner—Morton Foelak
Attorney, Agent, or Firm—D. Peter Hochberg; Mark Kusner; Louis J. Weisz

[57] ABSTRACT

A process for preparing foamed polymer blends of thermoplastic polymers with elastomeric polymers comprises mixing the elastomeric polymers with a chemical blowing agent and compounding additives. The mixture is then combined with a thermoplastic polymer to form a blend, and thereafter mixed with a curing system and a blowing agent activator. The curable composition thus prepared can subsequently be blown in either a one or two-step process. The two-step process entails partially curing the elastomer in the composition at a lower temperature, and then blowing the composition at a higher temperature. The one-step process involves (a) heating the composition to the higher temperature initially, thereby initiating curing, and after an activating induction period of the blowing agent, producing blowing; or (b) curing and blowing the composition by extruding it through an extruder. In both processes, the elastomer present in the blend is sufficiently cured prior to blowing to prevent the escape of the blowing bubbles, but not to the extent that bubble formation is prevented.

11 Claims, 1 Drawing Sheet

FOAMED POLYMER BLENDS

TECHNICAL FIELD

This invention relates to foamed blends of polymeric materials. More particularly, this invention relates to blends of thermoplastic polymers with elastomeric polymers, blown with chemical blowing agents. Specifically, this invention relates to chemically blown blends of thermoplastic polymers with desirably cured elastomeric polymers in which the cure-produced cross-linking present in the elastomers during blowing is such that the modulus of the elastomers is sufficiently high to prevent escape of the gas bubbles produced during blowing, but not so high as to exceed the level at which bubble formation in the elastomers would be detrimentally impeded.

BACKGROUND OF THE INVENTION

While both thermoplastic materials and elastomers are widely used in industrial and domestic applications, certain "hybrid" blended polymers displaying the attributes of both have come to be recognized as more desirable than either in certain applications, particularly in the automotive field. These blended polymers are generically known as thermoplastic elastomers.

A group of these materials, sometimes termed polyolefinic thermoplastic elastomers, POTPE, avoids the disadvantage of requiring rubber machinery for processing, but may be processed instead on conventional plastic processing equipment. Thus, while the materials display rubber-like properties at room temperature, they become plastic at elevated temperatures. This characteristic, for example, allows the blended materials to be readily extruded, injection molded, and otherwise worked without any need for excessive cycle times, specialized machinery, or other costly and often inconvenient processing expedients.

Among other applications, polyolefinic thermoplastic elastomers have been widely used in the form of foamed materials. Such products, for instance, are readily foamed during the process of extrusion by being injected with chlorofluorocarbons such as, for example, Freon 11, marketed by the EI DuPont Company of Wilmington, Del., and foamed products exhibiting desirably low densities, that is, in the order of 0.4 gms. per cc, have been formed in this way.

The use of chlorofluorocarbons has been linked by some with damage to the earth's ozone layer, however, and attempts have been made to find substitutes for such blowing agents. In this connection, modified forms of chlorofluorocarbons, i.e., hydrochlorofluorocarbons, HCFCs, have been suggested as possible substitutes for chlorofluorocarbons; however, these materials are still under development and their usefulness as replacement materials is still not certain. Furthermore, injection techniques require elaborate apparatus and necessitate careful monitoring, thus they are burdensome for those reasons as well.

Another approach to foaming has involved the use of so-called "chemical blowing agents", i.e., substances that decompose upon being heated to their decomposition temperature, producing desired blowing gases, such as nitrogen. Such materials pose no threat to the environment. However, when used with polyolefinic thermoplastic elastomers such as, for example, Santoprene, a POTPE marketed by Monsanto Company of Saint Louis, Missouri, the chemical blowing agents appear unable to produce foamed products with densities as low as those achievable with the chlorofluorocarbons. In this regard, they appear able only to effect marginal density reductions, that is, in the order of 15% to 20%. In any event, there is considerable potential advantage in finding suitable techniques for blowing polyolefinic thermoplastic elastomers without employing chlorofluorocarbons, but in a way in which blends exhibiting desirably low densities can be achieved. Such advantage includes the fact that POTPEs can be processed like thermoplastics, while exhibiting the resilience and elasticity of elastomers. In the automotive field, for example, such materials lend themselves to uses including weather stripping for automobiles, due to the excellent sealing ability made possible as a consequence of their softness.

DESCRIPTION OF THE INVENTION

In view of the preceding, therefore, it is a first aspect of this invention to prepare foamed blends of thermoplastic polymers with elastomeric polymers.

It is a second aspect of this invention to prepare foamed blends of thermoplastic polymers with elastomeric polymers, utilizing chemical blowing agents.

It is an additional aspect of this invention to provide foamed blends of thermoplastic polymers with elastomeric polymers, characterized by relatively low densities of the blends.

Another aspect of this invention is to provide a process in which foamed blends of thermoplastic polymers with elastomeric polymers having densities substantially as low as those obtainable using chlorofluorocarbons can instead be prepared with chemical blowing agents.

It is a further aspect of this invention to limit the degree of cross-linking of elastomeric polymers contained in blends with thermoplastic polymers during the foaming of the blends by means of chemical blowing agents.

Yet another aspect of this invention is to provide a process for blowing blends of thermoplastic polymers with elastomeric polymers in which the blowing occurs in both phases of the polymeric blends.

Still a further aspect of this invention is to provide both a one-step, and a two-step process for preparing foamed blends of thermoplastic polymers with elastomeric polymers, using chemical blowing agents.

The foregoing and additional aspects of this invention are provided by a process for preparing a foamed polymeric material from a blend of a thermoplastic polymer with an elastomeric polymer comprising the following steps: (1) mixing a chemical blowing agent and rubber compounding additives with said elastomeric polymer to form a mixture; (2) mixing said mixture with a thermoplastic polymer at a temperature at which at least one of said polymers is in a fluid state, thereby forming a homogeneous blend; (3) mixing said blend with a curing system to form a curable composition; and (4) activating said curing system and said blowing agent so that the blowing of said material commences no sooner than when curing commences and before said elastomeric polymer has been fully cured.

The foregoing and other aspects of this invention are provided by a foamed polymer blend prepared by the process of the preceding paragraph.

The foregoing and further aspects of this invention are provided by a process for preparing a foamed polymeric material from a blend of polypropylene and a ethylene-propylene terpolymer comprising: (1) mixing a chemical blowing agent and rubber compounding additives with said ethylene-propylene terpolymer to form a mixture; (2) mixing said mixture with polypropylene at a temperature at which at least one of said polymers is in a fluid state thereby to form a homogeneous blend; (3) mixing said blend with a curing system to form a curable composition; and (4) activating said curing system and said blowing agent so that the blowing of said material commences no sooner than when curing commences and before said terpolymer has been fully cured, wherein the ratio of the resins, i.e., terpolymer to said polypropylene, on a weight basis, is from about 1:1 to about 3:1, and wherein a chemical blowing agent activator is added during step (3).

The foregoing and still additional aspects of this invention are provided by a foamed polymer blend prepared by the process of the preceding paragraph.

BRIEF DESCRIPTION OF THE INVENTION

The invention will be better understood when reference is had to FIG. 1, showing a schematic graph plotting the elastomeric modulus versus the degree of elastomeric cure, with differences in blowing timing illustrated thereon.

DETAILED DESCRIPTION OF THE INVENTION

Figure 1:
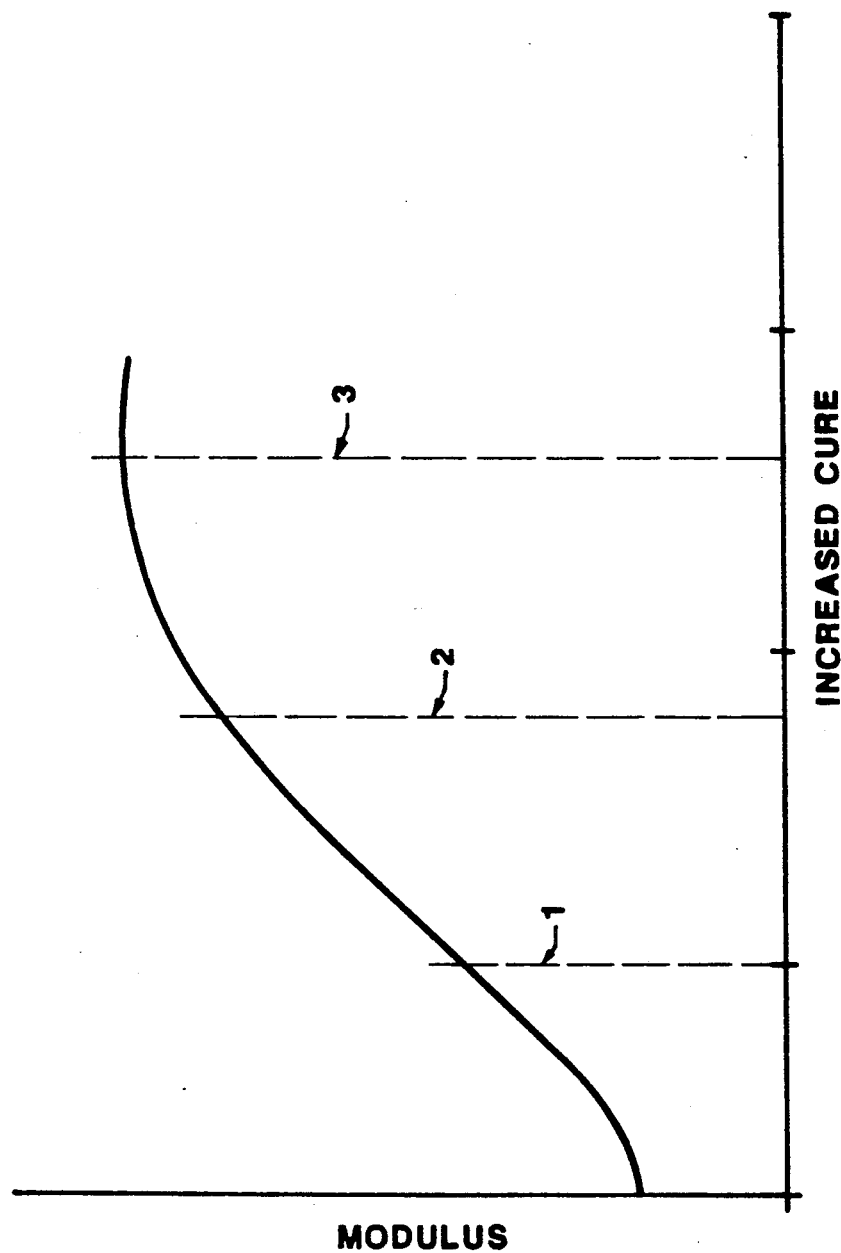

While not wishing to be bound by theory, physical evidence suggests that foaming in the thermoplastic phase of blends containing both thermoplastic and cured elastomeric compounds can be achieved with little difficulty. However, foaming of the elastomeric phase appears to be considerably more difficult. For this reason, it is hard to obtain desirable low densities in blends containing a relatively high proportion of a cured elastomer since foaming appears to occur primarily in the thermoplastic polymer present. This phenomenon makes it difficult to realize the improved elastic sealing qualities one would expect to find in a composition containing a foamed elastomeric polymer.

It is thought that the resistance of cured elastomers to foaming is the result of undesirably high modulus characteristics. In this regard, it is surmised that to be successfully blown, a cured elastomeric polymer requires a "balance" of modulus. By way of explanation, if the level of cross-linking is too high when the chemical blowing agent is activated, the modulus of the elastomeric phase is probably too high to favor growth of the gas bubbles produced by the blowing agent, thereby leading to inferior foaming. On the other hand, if the degree of cross-linking is too low, resulting in an elastomeric phase having a low modulus, the gas bubbles formed tend to expand and escape, again producing inferior blowing. In other words, there appears to be an optimum cross-linking level between the two extremes, i.e., where the modulus of the elastomer is low enough to permit optimal bubble growth, but high enough to retain the bubbles, making it possible to produce a foamed elastomer in which the bubbles are uniformly distributed throughout the elastomeric phase. In the case of thermoplastic/elastomeric blends contemplated by this invention, it has been found that by controlling the curing of the elastomeric phase of the blends, blowing can be successfully achieved in both the elastomeric and thermoplastic phases, permitting foamed blends with desirably low densities to be achieved.

The effect of the phenomenon is demonstrated by the fact that when an attempt is made to employ chemical blowing agents with blends of thermoplastic polymers and fully cured elastomeric polymers in which the thermoplastic constituent is present to an extent of about 70%, by weight, in other words a relatively hard blend, a 100% expansion, by volume, of the blend can be achieved during the blowing process. When, however, the thermoplastic constituent is present in amount of about 12–15%, by weight, a softer blend, expansions of only about 15–25%, by volume, are achievable.

FIG. 1 is a schematic graph illustrating the effect of modulus, i.e., the extent of curing, with timing of the blowing process. In the Figure, modulus of the elastomer is plotted against increasing cure time. Three different points are shown on the curve at which the blowing process is carried out. Thus, 1 in the FIGURE, shows the case in which blowing occurs at a relatively low modulus. This allows escape of the blowing bubbles from the elastomer and results in a roughened surface, reflecting the bursting of the bubbles through the skin of the material. Point 3 on the other hand, illustrates the case where blowing is carried out essentially after the elastomer is fully cured. In this situation, there is little bubble formation, and therefore, minimal expansion, i.e., little density reduction. Point 2 on the other hand, illustrates the point at which blowing of the elastomer is conducted after sufficient modulus to prevent escape of the bubbles has developed during the curing process, but where the modulus is still low enough to permit bubble growth and retention, the optimum situation.

In view of the preceding, therefore, the invention includes the concept of preparing curable blend compositions of thermoplastic polymers and elastomeric polymers, particularly blend compositions containing relatively high amounts of elastomeric constituents. The blend compositions, which are compounded to contain both curing systems and blowing agents are then cured and blown, the blowing sequence being timed so that blowing is occurring after curing has begun, in a preferred mode, after 75% to 80% of the curing has taken place. Several techniques can be employed to achieve the low density foams that the invention is capable of producing, i.e., those having densities as low as 0.5 gms. per cc to about 0.4 gms. per cc.

In one embodiment of the invention, sometimes termed a two-step, or "static" process, a curable polymer blend compound containing a thermoplastic polymer and an elastomeric polymer, and including a blowing agent that is activated at a higher temperature than the curing system, is cured to a desired point in an initial step carried out at a temperature high enough to activate curing, but which is insufficient to initiate blowing. In a second step thereafter, the composition is heated to the activation temperature of the blowing agent, producing the blown polymer blend.

In a second technique, both curing and blowing of the curable polymer blend composition are carried out substantially simultaneously in a one-step, or "reactive" process. In some variations of the one-step process, while some bubble formation may occur prior to optimal cross-linking, sufficient blowing occurs thereafter, but before too high a modulus is attained, to produce a superior foamed blend product.

The broader aspects of the invention are illustrated in the following process flow diagram.

PROCESS FLOW DIAGRAM

Preparation of Elastomeric Polymer Compound

Mixing an elastomeric polymer with compounding additives and a chemical blowing agent at a temperature sufficiently low to avoid activation of the agent, thereby forming an Elastomeric Polymer Compound.

↓

Preparation of Polymer Blend

Mixing the Elastomeric Polymer Compound with a thermoplastic polymer at a temperature sufficiently high to fluidize at least one of the polymers, thereby forming a homogeneous Polymer Blend.

↓

Preparation of Curable Composition

Mixing the Polymer Blend with curing system components, and preferably with a chemical blowing agent activator, at a temperature sufficiently low to avoid initiation of curing, thereby forming a Curable Composition.

↙ ↘

One-Step Foaming Process

Heating the Curable Composition to a temperature sufficiently high to initiate simultaneous curing/blowing, thereby providing a foamed polymer blend, or extruding the Curable Composition with control of the extruder's temperature zones to assure a desired curing/blowing activation sequence, thereby providing a foamed, extruded polymer blend.

Two-Step Foaming Process

Initially partially curing the Curable Composition at a temperature below the activation temperature of the chemical blowing agent, thereby providing a Cured Polymer Blend incorporating a cures elastomer, and

↓ thereafter heating the Cured Polymer blend to the chemical blowing agent's activation temperature, thereby providing a Foamed Polymer Blend.

Referring to the diagram, the preparation of the elastomeric polymer compound involves the incorporation of various compounding additives and a chemical blowing agent with a selected elastomeric polymer.

Various polymers may be used for the purpose including natural rubber, and synthetic rubbers such as olefin based elastomers including ethylene-propylene terpolymers (EPDM), nitrile rubbers, SBR, polybutylene and others. In a preferred embodiment, however, EDPM rubber is employed.

Added at this point in the process are rubber compounding additives such as, for instance, those well known in the art including processing oils, non-reinforcing fillers, zinc oxide, stearic acid, lubricants, processing aids, and the like.

Also at this point, a high temperature blowing agent is added to the elastomeric polymer compound. The use of high-temperature blowing agents is necessary in order to avoid premature activation of the agents during incorporation of the thermoplastic polymer selected, as will be apparent from the discussion below. Such blowing agents include, for example, those activated at from about 150° C. to about 260° C. An example of an additive of this type is p-toluene sulfonyl semicarbazide, marketed by Uniroyal Chemicals under the trademark Celogen RA, which has a decomposition temperature ranging from 216° C. to 260° C. Another similar material is azodicarbonamide, also marketed by Uniroyal Chemicals under the trademark Celogen AZ 130. The latter compound decomposes at from about 199° C. to 232° C. Other similar high-temperature blowing agents of the types known to those skilled in the art including, for example, 5-phenyltetrazole, isatoic anhydride, and trihydrazino-triazine may also be used. In some cases, auxilliary blowing agents in very small quantities may also be added for initiation/nucleation, examples of such auxilliary chemical blowing agents being azodicarbonamide; diphenyl sulfone-3,3'-disulfohydrazide; 4-4'-oxybis(benzenesulfohydrazide), and di-phenylene oxide-4-4'-disulfohydrazide.

Incorporation of the above-described components may readily be accomplished, for instance, in extruding equipment, roll mills, internal mixers, static mixers, or similar devices.

The time required for obtaining a uniform mixture will depend upon the relative amounts of the components present, their specific nature, the temperature at which the mixing operation is conducted, as well as the equipment employed, and other variables. In any event, mixing should be carried out at a temperature below that at which activation of the blowing agent would occur. Typically, for example, mixing is carried out at about 120° C. for a period sufficient to assure that a uniform mixture is obtained.

Following preparation of the elastomeric polymer compound as indicated, a polymer blend is prepared by adding a selected thermoplastic polymer to the elastomeric polymer compound at a temperature sufficiently high to fluidize at least one of the polymers forming the blend.

Among thermoplastic polymers desirable for purposes of the invention may be mentioned polyolefin polymers such as polypropylene, polyethylene and poly(4-methyl pentene-1) as well as polymers such as polystyrene, poly(methyl methacrylate), poly (vinylidene chloride) and others. However, in a preferred embodiment of the invention, polypropylene is employed.

Any of various ratios of the elastomeric polymer to the thermoplastic polymer may be employed, depending upon the nature of the blown product required. It has been found however that blends in which the ratio is adjusted from about 1:1 to about 3:1, elastomer to thermoplastic polymer, provide particularly soft, low density polymer blends characterized by excellent sealing characteristics. The use of such ratios, equivalent to blends containing from about 50% to 75% elastomer, is therefore particularly preferred.

In order to obtain superior homogeneity of the polymers making up the blends, it is necessary that the mixing be conducted at a temperature sufficiently high to fluidize at least one of the polymers. In other words, the temperature must be high enough to transform at least one of the polymers into a fluid state. When the material thus becomes a viscous liquid, as for instance above its Crystalline Melting Point, a homogeneous polymer blend is obtained. The temperature at which the blending is carried out, however, must not be high enough to activate the blowing agent present since this would result in premature blowing and loss of formed bubbles due to the relatively low modulus of the elastomeric polymer at this point in the process. The optimum temperature will depend upon the nature of the polymers being blended, as well as other factors, and is readily determined by simple experimentation.

In the case of blending polypropylene with EPDM, for example, where a Celogen RA blowing agent is present, the blending is carried in equipment of the type previously described at a temperature of about 165° C. to about 180° C.

If desired, additional blowing agent can be introduced at this point to assure that the thermoplastic polymer added will contain a sufficient amount of blowing agent, or the additional blowing agent can be added to the thermoplastic polymer before it is blended with the elastomeric polymer. Normally, however, a sufficient amount of blowing agent will have been incorporated with the elastomer to migrate into the thermoplastic polymer during the blending procedure. The required amount of blowing agent to be added in the procedures outlined will depend upon the nature of the blowing agent, as well as the kind of polymers making up the blend, as well as the nature of the blown product desired, and will be determined be empirically.

Following preparation of the polymer blend detailed in the preceding, suitable curing system components, and preferably a chemical blowing agent activator, are added to the blend at a temperature sufficiently low to avoid initiation of curing. Suitable activator compounds include those known in the art, comprising various polyols, ureas, organic acids and bases, as well as large numbers of metallic compounds, particularly basic lead, zinc and/or cadmium. The chemical blowing agent p-toluene sulfonyl semicarbazide, for example, can be activated strongly by urea, dibasic lead phthalate, stearate, phosphite, etc., or it can be mildly activated by zinc oxide, stearic acid, zinc stearate, or barium stearate.

Any of the curing systems of the types known in the rubber industry may be employed to cross-link the elastomeric polymer, for instance, those including sulfur, tetramethylthiuram disulfide (TMTD), 2-mercaptobenzothiazyl disulfide (MBTS), and equivalent systems.

In addition, in a particularly preferred embodiment of the invention, a chemical blowing agent activator is added at this point. Such activators are well known in the art, being exemplified by BIK OT marketed by Uniroyal Chemicals. The proper amount of activator required will depend upon the nature and amount of the chemical blowing agent, and can readily be determined by simple trial. Such activators not only enhance the action of the chemical blowing agents, but allow blowing to occur at lower temperatures, thus avoiding the discoloration that sometimes occurs when such blends are heated to the normal activation points of their blowing agents.

The amount of the curing components required will depend upon the degree of cross-linking needed to obtain the modulus necessary to achieve optimal blowing. This in turn will depend upon the nature of the elastomer being used, as well as the type of product which it is desired to achieve. Again, simple experimentation is employed to determine the amount necessary.

In order to avoid premature curing of the curable composition thus prepared, the mixing of the ingredients required to form the composition will be carried out, for example, in equipment of the type described, at a temperature low enough to avoid activation of the curing system. While this will depend upon the nature of the curing system, commonly, the mixing will be carried out a temperature no higher than about 130° C. until the ingredients are uniformly dispersed throughout the composition.

Following preparation of the curable composition as aforesaid, typically containing about 30% to 70%, by weight, of the resins, the blend may be blown in either a one-step static process, or in a two-step, reactive process.

In the static process, the curable blend composition is initially cured at a temperature high enough to activate the curing system, but lower than that required to activate the chemical blowing agent. Cure of the elastomer then proceeds to a point predetermined by the amount of curing components added, such amount being that previously found to produce cross-linking which results in a modulus sufficient to permit bubble formation during the subsequent blowing operation, but which is insufficient to significantly impair formation of the bubbles.

Thereafter, the temperature of the blend containing the partially cured elastomer is increased to the activation temperature of the blowing agent, thus initiating the blowing that results in the final foamed blend product. The temperatures required for each of the steps will depend upon the nature of the curing system and the chemical blowing agent used.

Within such considerations, commonly the curing step will proceed at a temperature of from about 160° C. to 170° C. for 10 to 15 minutes, while the blowing process will take place at about 210° C. to 235° C. for about 5 minutes.

The reactive process lends itself to extrusion of the curable composition, a process that results in the substantially simultaneous curing and blowing of the curable composition. The extruders may be equipped with controllable "heating zones" along their barrels. This permits their adjustment to obtain the desired sequence of curing and blowing activation so that the bubbles formed are generated at an optimal modulus.

Alternatively, the reactive process may be carried out in a pressure mold maintained at a temperature sufficient to activate both the curing system and the chemical blowing agent. In such a case, curing will proceed substantially immediately, while the chemical blowing agent will require an induction period to activate. This difference in effective activation time provides a delay sufficient to develop enough curing to provide the modulus necessary for proper blowing.

If desired, combinations of different chemical blowing agents can be employed to vary the speed of blowing. While several blowing options are available as described in the preceding, the foam densities resulting from the procedures are quite similar.

The following example, while not intended to be limiting in nature, is illustrative of the invention.

In a first step, EPDM, a processing oil, non-reinforcing fillers, zinc oxide, stearic acid, Celogen RA, wax, lubricant, and a processing aid are mixed on a two-roll mill with the roll temperature maintained at 120° C.

In a second step, the above mixture is blended with polyeropylene a two-roll mill with the roll temperature maintained at 180° C. Ordinarily because of the high decomposition temperature of the chemical blowing agent used, a processing temperature of 220° C. or higher would be required for full decomposition of the chemical blowing agent. The decomposition temperature, however, is significantly reduced by incorporation of a surface treated urea, BIK OT, as an activator, added in a third-step as follows.

The above blend is subsequently mixed with curatives including sulfur, TMTD, MBTS, BIK OT, and Celogen AZ 130, added for cell nucleation, on a two-roll mill with the roll temperature being maintained at 120° C.

Table 1 lists the formulation of the blends prepared by the above procedure.

TABLE 1

|  | Compound No. | | | | |
| --- | --- | --- | --- | --- | --- |
|  | 1 | 2 | Control | 3 | 4 |
| Epsyn 70A[1] | 100 | 100 | 100 | 100 | 100 |
| Profax 6823[2] | 39 | 39 | 35 | 35 | 35 |
| Minstron Vapor Talc[3] | 25 | 25 | 25 | 25 | 25 |
| Akrochem Allied Whiting A-1[4] | 25 | 25 | 25 | 25 | 25 |
| Sunpar 2280[5] | 120 | 120 | 100 | 120 | 120 |
| Stearic Acid[6] | 2 | 2 | 2 | 2 | 2 |
| Zinc Oxide[6] | 5 | 5 | 5 | 5 | 5 |
| Carbowax PEG 3350[7] | 2 | 2 | 2 | 2 | 2 |
| Struktol WB212[8] | 2 | 2 | 2 | 2 | 2 |
| Celogen RA[9] | 3 | 3 | — | 1 | 1 |
| CelognAZ130[9] | 1 | 1 | — | 0.25 | 0.25 |
| BIK OT[9] | — | 3 | — | 1 | 1 |
| Sulfur[6] | 2 | 2 | 1 | 1 | 0.5 |
| MBTS[4,10] | 0.5 | 0.5 | 0.25 | 0.25 | 0.125 |
| TMTD[4,11] | 1.0 | 1.0 | 0.50 | 0.50 | 0.25 |

Supplied by:
[1]Copolymer Rubber and Chemical Corp.
[2]Himont U.S.A., Melt Flow Index = 0.4 gm/10 min
[3]Cyprus Industrial Minerals Company
[4]Akrochem Corporation
[5]Sun Refining Company
[6]Fisher Scientific
[7]Harwick Chemical Corporation
[8]Struktol Company
[9]Uniroyal Chemical
[10]2,2'-dithiobisbenzothiazole
[11]Tetramethyl Thiuramdisulfide The compounded blend is then compression molded at 75° C. into 0.25 inch-thick sheets which are then foamed in an oven at different temperatures and different residence times. Two techniques are employed as follows.

(1) In a reactive process, the compression molded sheet is subjected to an oven temperature higher than the chemical blowing agent decomposition temperature to promote substantially simultaneous curing and blending.

(2) In a static process, the compression molded sheet is first cured at a temperature lower than the chemical blowing agent decomposition temperature. After this, the cured sheet is subjected to a temperature higher than the decomposition temperature of the chemical blowing agent to induce foaming.

Table 2, illustrating the one-step technique, shows the effectiveness of the activator in promoting the decomposition of the chemical blowing agent at a variety of temperatures and residence times.

TABLE 2

| Oven Temp. (°C.) | Residence Time (min) | Compound No. 1 | Compound No. 2 | Control Density (gm/cc) | Compound No. 3 | Compound No. 4 |
| --- | --- | --- | --- | --- | --- | --- |
| Ambient | — | — | — | 0.98 | 0.99 | 0.97 |
| 180 | 3 | 0.96 | 0.97 | — | — | — |
| 180 | 5 | 0.90 | 0.77 | — | — | — |
| 180 | 10 | 0.63 | 0.38 | 1.01 | 0.60 | 0.62 |
| 200 | 5 | 0.75 | 0.46 | 0.99 | 0.52 | 0.56 |
| 210 | 5 | — | — | 1.00 | 0.49 | 0.50 |

Table 3 shows the two-step foaming technique in which the blends, having a density of 0.97–0.99 gm/cc before any heating, were first cured at 165° C. to 180° C. for from 5 to 10 minutes, and then foamed at 210° C. for 5 minutes.

TABLE 3

| Cure Temp. (°C.) | Cure Time (min) | Compound No. 3 Density (gm/cc) | Compound No. 4 Density (gm/cc) |
| --- | --- | --- | --- |
| 165 | 5 | 0.87 | 0.82 |
| 165 | 10 | 0.81 | 0.77 |
| 180 | 5 | 0.71 | 0.72 |
| 180 | 10 | 0.60 | 0.62 |

While in accordance with the patent statutes, a preferred embodiment and best mode has been presented, the scope of the invention is not limited thereto, but rather is measured by the scope of the attached claims.

What is claimed is:

1. A process for preparing a foamed polymeric material from a blend of a thermoplastic polymer selected from the group consisting of a polyolefin, polystyrene, poly(methyl methacrylate) and poly(vinylidene chloride) with an elastomeric polymer selected from the group consisting of natural and synthetic rubbers comprising the following steps:

(1) mixing a chemical blowing agent and rubber compounding additives with said elastomeric polymer to form a mixture;

(2) mixing a mixture with said thermoplastic polymer at a temperature at which at least one of said polymers is in a fluid state, thereby forming a homogeneous blend;

(3) mixing said blend with a curing system to form a curable composition; and (4) activating said curing system and said blowing agent so that the blowing of said material commences no sooner than when curing commences and before said elastomeric polymer has been fully cured.

2. A process according to claim 1 wherein the ratio of said elastomeric polymer to said thermoplastic polymer, on a weight basis, is from about 1:1 to about 3:1.

3. A process according to claim 1 wherein in the absence of a chemical blowing agent activator, said blowing agent must be heated to a temperature higher than that of step (2) in order to be activated.

4. A process according to claim 3 in which a chemical blowing agent activator is added during step (3).

5. A process according to claim 1 wherein said curing system and said blowing agent are heated to their activation temperature substantially simultaneously.

6. A process according to claim 1 wherein said activation takes place as said material is processed through an extruder.

7. A process according to claim 1 wherein said curing system is activated and said material is partially cured before said blowing agent is activated.

8. A process according to claim 1 in which said thermoplastic polymer is a polyolefin, and said elastomeric polymer is an olefin-based elastomer.

9. A process according to claim 5 in which said thermoplastic polymer is polypropylene, and said elastomeric polymer is an ethylene-propylene terpolymer.

10. A process for preparing a foamed polymeric material from a blend of a polypropylene and an ethylene-propylene terpolymer comprising:

(1) mixing a chemical blowing agent and rubber compounding additives with said ethylene-propylene terpolymer to form a mixture;

(2) mixing said mixture with polypropylene at a temperature at which at least one of said polymers is in a fluid state, thereby to form a homogeneous blend;

(3) mixing said blend with a curing system to form a curable composition; and (4) activating said curing system and said blowing agent so that the blowing of said material commences no sooner than when curing commences, and before said terpolymer has been fully cured;

wherein the ratio of said terpolymer to said polypropylene, on a weight basis, is from about 1:1 to about 3:1, and wherein a chemical blowing agent activator is added during step (3).

11. A process according to claim 10 wherein said curing system is activated and said material is partially cured before said blowing agent is activated.

* * * * *